(12) United States Patent
Hayashi et al.

(10) Patent No.: US 10,361,448 B2
(45) Date of Patent: Jul. 23, 2019

(54) FUEL CELL STACK

(71) Applicant: TOYOTA JIDOSHA KABUSHIKI KAISHA, Toyota-shi, Aichi-ken (JP)

(72) Inventors: Daisuke Hayashi, Nissin (JP); Daisuke Kanno, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 33 days.

(21) Appl. No.: 15/832,991

(22) Filed: Dec. 6, 2017

(65) Prior Publication Data

US 2018/0166728 A1 Jun. 14, 2018

(30) Foreign Application Priority Data

Dec. 14, 2016 (JP) ................. 2016-242010

(51) Int. Cl.
*H01M 8/04* (2016.01)
*H01M 8/242* (2016.01)
*H01M 8/2457* (2016.01)
*H01M 8/0273* (2016.01)
*H01M 8/0276* (2016.01)
*H01M 8/1004* (2016.01)
*H01M 8/2485* (2016.01)
*H01M 8/0258* (2016.01)
*H01M 8/247* (2016.01)

(52) U.S. Cl.
CPC ......... *H01M 8/242* (2013.01); *H01M 8/0258* (2013.01); *H01M 8/0273* (2013.01); *H01M 8/0276* (2013.01); *H01M 8/1004* (2013.01); *H01M 8/2457* (2016.02); *H01M 8/2485* (2013.01); *H01M 8/247* (2013.01)

(58) Field of Classification Search
CPC ...................................... H01M 8/04
See application file for complete search history.

(56) References Cited

U.S. PATENT DOCUMENTS

2004/0265667 A1* 12/2004 Kato ................ H01M 8/04029
429/434
2016/0211543 A1 7/2016 Okabe et al.

FOREIGN PATENT DOCUMENTS

| JP | 2006-139944 | 6/2006 |
|----|-------------|--------|
| JP | 2010-182488 | 8/2010 |
| JP | 2013-114899 | 6/2013 |
| JP | 2014-175237 | 9/2014 |
| JP | 2015-69737  | 4/2015 |
| JP | 2015-225709 | 12/2015 |

* cited by examiner

*Primary Examiner* — Jacob B Marks
(74) *Attorney, Agent, or Firm* — Finnegan, Henderson, Farabow, Garrett & Dunner, LLP

(57) ABSTRACT

A power generation cell of a fuel cell stack has a plurality of first introduction flow paths arranged along a direction of gravity to introduce the reaction gas to a power generation region. The dummy cell has a plurality of second introduction flow paths arranged along the direction of gravity to introduce the reaction gas to a central region. The fuel cell stack has at least one of a first configuration in which the flow path width of the second introduction flow path at a lowermost end in the direction of gravity is narrower than the average flow path width of the second introduction flow paths, and a second configuration in which the flow path width of the first introduction flow path at a lowermost end in the direction of gravity is wider than the average flow path width of the first introduction flow paths.

7 Claims, 10 Drawing Sheets

POWER GENERATION CELL

FUEL CELL STACK

INCORPORATION BY REFERENCE

The disclosure of Japanese Patent Application No. 2016-242010 filed on Dec. 14, 2016 including the specification, drawings and abstract is incorporated herein by reference in its entirety.

BACKGROUND

1. Technical Field

The present disclosure relates to a fuel cell stack.

2. Description of Related Art

A fuel cell stack in which a plurality of power generation cells is stacked and dummy cells that do not generate power are provided on both sides in the stacking direction of the power generation cells is described (for example, Japanese Unexamined Patent Application Publication No. 2015-69737 (JP 2015-69737 A).

SUMMARY

In a case where liquid water flows into a supply manifold for a reaction gas to be supplied to a fuel cell, the liquid water flows toward the lower side of the supply manifold in the direction of gravity. At this time, there may be cases where the liquid water flows over the dummy cell and intensively infiltrates into a specific power generation cell, and there are problems that the reaction gas cannot be supplied and that the power generation cell cannot sufficiently generate power.

An aspect relates to a fuel cell stack including: a plurality of power generation cells stacked; and a dummy cell that is provided, of both end portions of the power generation cells, at the end portion on an upstream side in a direction in which a reaction gas supplied to the fuel cell stack flows and that does not generate power. The fuel cell stack has a reaction gas supply manifold which passes through the power generation cells and the dummy cell pass. The power generation cell has a plurality of first introduction flow paths arranged along a direction of gravity to introduce the reaction gas from the reaction gas supply manifold to a power generation region of the power generation cell. The dummy cell has a plurality of second introduction flow paths arranged along the direction of gravity to introduce the reaction gas from the reaction gas supply manifold to a central region of the dummy cell. The fuel cell stack has at least one of a first configuration in which the flow path width of the second introduction flow path at a lowermost end in the direction of gravity among the second introduction flow paths is narrower than the average flow path width of the second introduction flow paths, and a second configuration in which, in the one or more power generation cells adjacent to the dummy cell, the flow path width of the first introduction flow path at a lowermost end in the direction of gravity among the first introduction flow paths is wider than the average flow path width of the first introduction flow paths.

In a case where the liquid water introduces into the reaction gas supply manifold, the liquid water flows along the lower surface of the reaction gas supply manifold positioned on the lower side in the direction of gravity. Here, when the reaction gas introduction flow path is blocked with the liquid water, the liquid water flows into the power generation cell or the dummy cell due to the pressure difference between the upstream side and the downstream side of the reaction gas introduction flow path. According to the aspect, in a case where the first configuration is adopted, the flow path width of the second introduction flow path at the lowermost end in the direction of gravity among the second introduction flow paths is narrower than the average flow path width of the second introduction flow paths. Therefore, the liquid water easily moves to the central region of the dummy cell, and the amount of the liquid water moving to the power generation cell is reduced by the amount of the liquid water moving to the central region of the dummy cell. Therefore, the movement amount of the liquid water moving to the power generation region of the power generation cell, particularly one or more specific power generation cells adjacent to the dummy cell is reduced.

In addition, in a case where the second configuration is adopted, the flow path width of the first introduction flow path at the lowermost end in the direction of gravity among the first introduction flow paths is wider than the average flow path width of the first introduction flow paths. Therefore, in a case where the same amount of the liquid water moves from the dummy cell, it becomes more difficult to block the first introduction flow path at the lowermost end in the direction of gravity with the liquid water. In addition, since the pressure difference between the upstream side and the downstream side of the reaction gas introduction flow path is relatively small, the movement amount of the liquid water particularly moving to the power generation region of the power generation cell can be further reduced. That is, the intensive infiltration of the liquid water into the power generation region of the specific power generation cell can be suppressed.

In the fuel cell stack according to the aspect, the fuel cell stack may have both the first configuration and the second configuration. According to the aspect, the movement of the liquid water to the central region of the dummy cell is facilitated in the first configuration, and the movement of the liquid water to the power generation region of the specific power generation cell is suppressed in the second configuration. Therefore, the intensive infiltration of the liquid water into the power generation region of the specific power generation cell can be further suppressed.

In the fuel cell stack according to the aspect, the flow path width of the second introduction flow path at the lowermost end in the direction of gravity may be narrower than the flow path width of the first introduction flow path at the lowermost end in the direction of gravity. According to the aspect, it becomes easy to block the second introduction flow path at the lowermost end in the direction of gravity and it becomes more difficult to block the first introduction flow path at the lowermost end in the direction of gravity with the liquid water. Therefore, the liquid water easily moves to the central region of the dummy cell and the movement of the liquid water to the power generation region of the specific power generation cell is suppressed. Therefore, the intensive infiltration of the liquid water into the power generation region of the specific power generation cell can be further suppressed.

In the fuel cell stack according to the aspect, in the first configuration, the flow path width of the second introduction flow path at the lowermost end among the second introduction flow paths may be the narrowest among the second introduction flow paths.

In the fuel cell stack according to the aspect, in the first configuration, regarding flow path widths of the second introduction flow paths, the flow path widths of the second introduction flow paths positioned above the second introduction flow path at the lowermost end may be set such that the farther the second introduction flow path apart from the second introduction flow path at the lowermost end, the wider the flow path width of the second introduction flow path.

In the fuel cell stack according to the aspect, in the second configuration, the flow path width of the first introduction flow path at the lowermost end among the first introduction flow paths may be the widest among the first introduction flow paths.

In the fuel cell stack according to the aspect, in the second configuration, the flow path widths of the first introduction flow paths positioned above the first introduction flow path at the lowermost end may be set such that the farther the first introduction flow path apart from the first introduction flow path at the lowermost end, the narrower the flow path width of the first introduction flow path.

According to the aspect, the fuel cell stack can be realized as various forms, and, for example, can be realized as various forms, such as a fuel cell system, a power generation cell, and a dummy cell other than the fuel cell stack.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

First Embodiment

Figure 1:
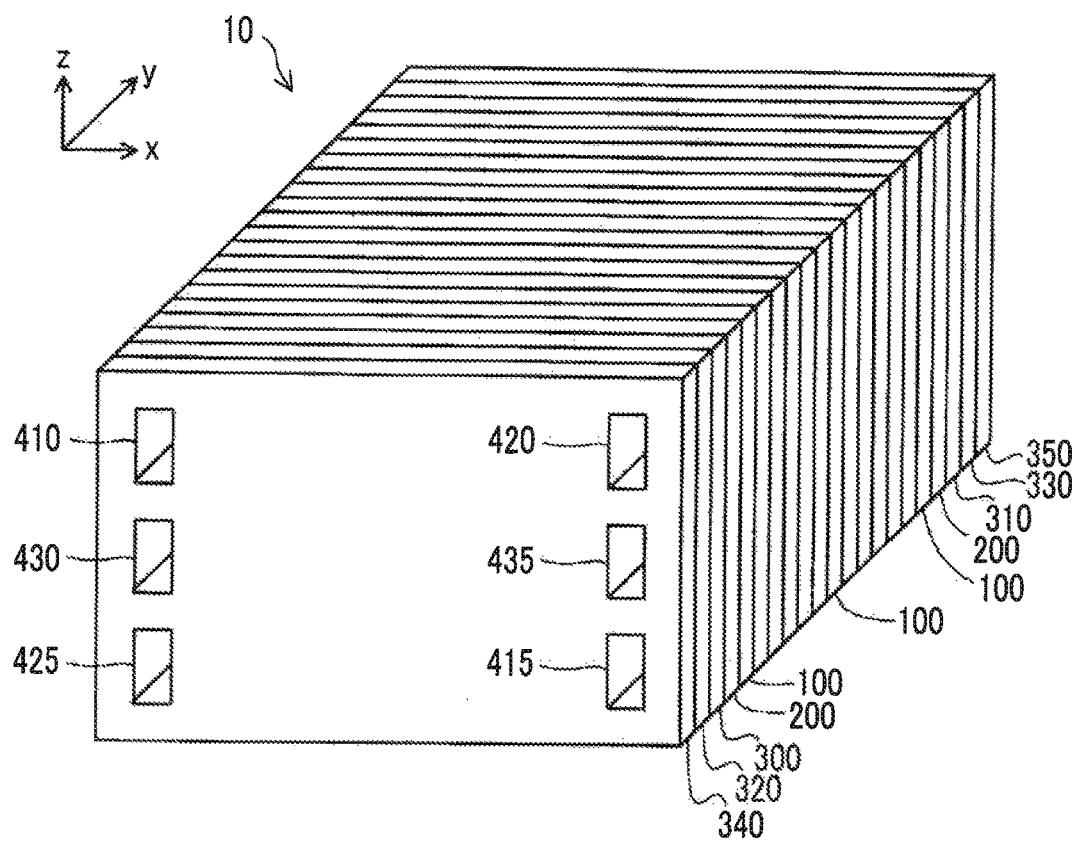
FIG. 1 is a perspective view of a fuel cell stack.

FIG. 1 is a perspective view of a fuel cell stack 10. The fuel cell stack 10 includes a plurality of power generation cells 100, dummy cells 200, current collecting plates 300, 310, insulating plates 320, 330, and end plates 340, 350. The power generation cells 100 are stacked in a y direction (horizontal direction) and form a stacked body. Here, in a first embodiment, horizontal directions are referred to as an x direction and the y direction, and a vertical direction is referred to as a z direction. A downward direction in the vertical direction is the direction of gravity. The dummy cells 200 are disposed on both sides of the stacked body of the power generation cells 100 in the y direction with the power generation cells 100 interposed therebetween. Here, the dummy cells 200 may be provided, of both end portions of the power generation cells 100, at the end portion on the upstream side in a direction in which a reaction gas supplied to the fuel cell stack 10 flows. The current collecting plates 300, 310 are disposed outside the dummy cells 200 in the y direction with the power generation cells 100 and the dummy cells 200 interposed therebetween. The insulating plates 320, 330 are disposed outside the current collecting plates 300, 310 in they direction with the power generation cells 100, the dummy cells 200, and the current collecting plates 300, 310 interposed therebetween. The end plates 340, 350 are disposed outside the insulating plates 320, 330 in the y direction with the power generation cells 100, the dummy cells 200, the current collecting plates 300, 310, and the insulating plates 320, 330 interposed therebetween.

The fuel cell stack 10 includes a cathode gas supply manifold 410, a cathode gas discharge manifold 415, an anode gas supply manifold 420, an anode gas discharge manifold 425, a refrigerant supply manifold 430, and a refrigerant discharge manifold 435 which pass through the power generation cells 100, the dummy cells 200, the current collecting plates 300, 310, the insulating plates 320, 330, and the end plates 340, 350. Among the manifolds, the manifolds used to supply the reaction gas (also referred to as "reaction gas supply manifolds", specifically including the cathode gas supply manifold 410 and the anode gas supply manifold 420) are formed at positions higher than the manifolds used to discharge the reaction gas (also referred to as "reaction gas discharge manifolds", specifically including the cathode gas discharge manifold 415 and the anode gas discharge manifold 425) in the direction of gravity.

Figure 2:
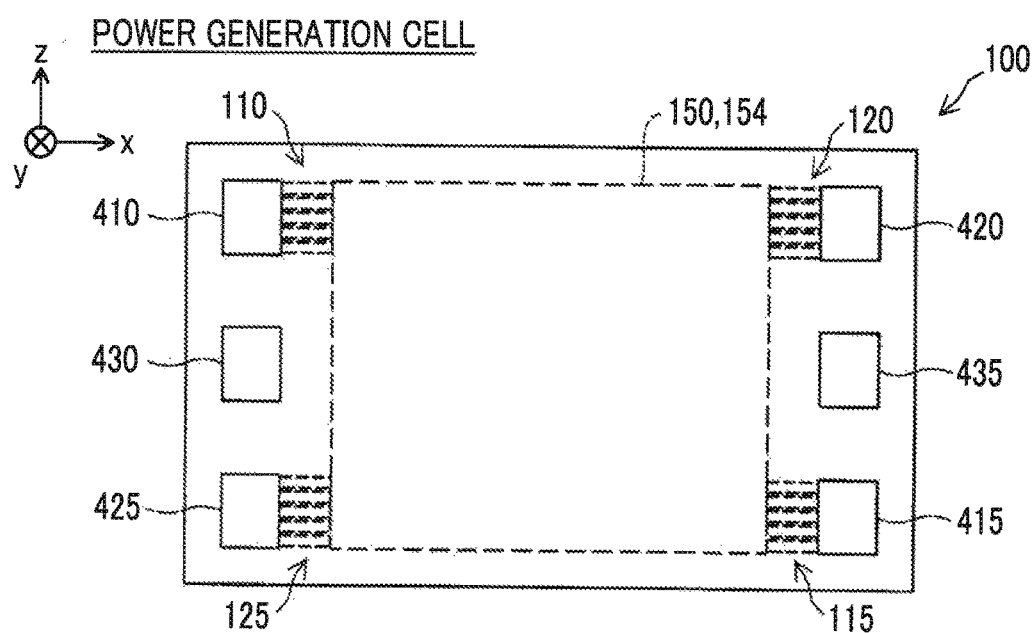
FIG. 2 is a plan view schematically illustrating a power generation cell.

FIG. 2 is a plan view schematically illustrating the power generation cell 100. A central region 150 of the power generation cell 100 is a power generation region where a membrane electrode assembly 154 is provided. The power generation cell 100 includes a power generation cell cathode gas introduction flow path 110 (also referred to as "the first introduction flow path 110") used to introduce a cathode gas from the cathode gas supply manifold 410 to the central region 150, a power generation cell cathode gas lead-out flow path 115 used to lead out the cathode gas from the central region 150 to the cathode gas discharge manifold 415, a power generation cell anode gas introduction flow path 120 (also referred to as "the first introduction flow path 120") used to introduce an anode gas from the anode gas supply manifold 420 to the central region 150, and a power generation cell anode gas lead-out flow path 125 used to lead out the anode gas from the central region 150 to the anode gas discharge manifold 425. The structures of the power generation cell anode gas introduction flow path 120 and the like will be described later.

Figure 3:
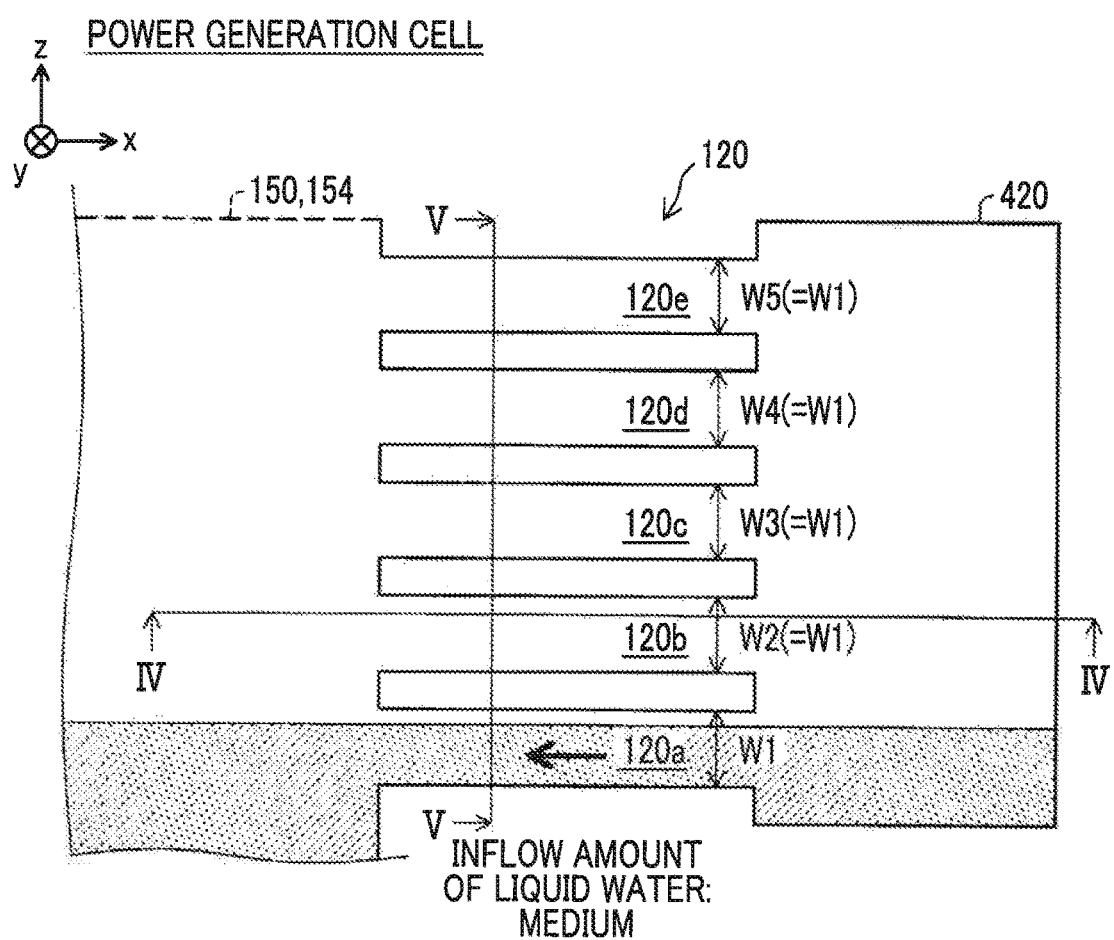
FIG. 3 is an enlarged schematic explanatory view illustrating a power generation cell anode gas introduction flow path.

FIG. 3 is an enlarged schematic explanatory view illustrating the power generation cell anode gas introduction flow path 120. The power generation cell anode gas introduction flow path 120 includes a plurality of power generation cell anode gas introduction flow paths 120a, 120b, 120c, 120d, 120e arranged along the direction of gravity, and flow path widths W1, W2, W3, W4, W5 thereof are the same. Here, the flow path width is a width measured in the direction of gravity. In addition, in a case where the width of a flow path varies with the position in the x direction, the average value thereof is used as the flow path width of the flow path. In addition, the heights of (the widths in the y direction) of the power generation cell anode gas introduction flow paths 120a, 120b, 120c, 120d, 120e are substantially the same, and the cross-sectional areas and the flow path widths are proportional to each other. Therefore, in a case where the power generation cell anode gas introduction flow paths 120a, 120b, 120c, 120d, 120e are compared to each other, the cross-sectional areas thereof instead of the flow path widths may be used. In the example illustrated in FIG. 3, the number of power generation cell anode gas introduction flow paths 120 is five, but is not limited thereto, and may be two or more. When the liquid water infiltrates into the anode gas supply manifold 420, there is a possibility that the power generation cell anode gas introduction flow path 120a at the lowermost end in the direction of gravity may be blocked. In the example in FIG. 3, although most of the power generation cell anode gas introduction flow path 120a at the lowermost end in the direction of gravity is blocked with the liquid water, the power generation cell anode gas introduction flow paths 120b to 120e positioned above the lowermost end in the direction of gravity are not blocked with the liquid water.

Figure 4:
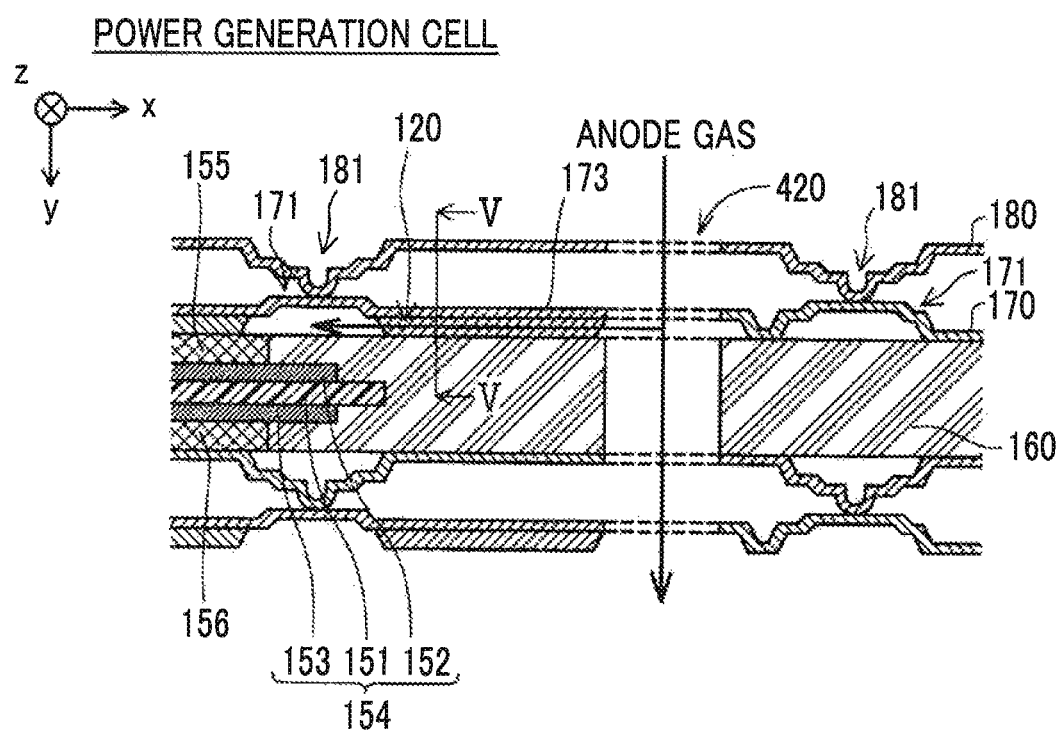
FIG. 4 is a sectional view of the power generation cell anode gas introduction flow path taken along the section IV-IV of FIG. 3.

FIG. 4 is a sectional view of the power generation cell anode gas introduction flow path taken along the section IV-IV of FIG. 3. The power generation cell 100 includes a frame 160, an anode separator plate 170, and a cathode separator plate 180. The frame 160 is formed of, for example, a resin and holds the membrane electrode assembly 154. The membrane electrode assembly 154 includes an electrolyte membrane 151, an anode catalyst layer 152, and a cathode catalyst layer 153. The electrolyte membrane 151 is formed of an ion-exchange resin membrane that exhibits good proton conductivity in a wet state. More specifically, the electrolyte membrane 151 is formed of a fluororesin-based ion-exchange resin membrane having a sulfonic acid group as an ion-exchange group, such as Nation (registered trademark). Each of the anode catalyst layer 152 and the cathode catalyst layer 153 has carbon that supports a catalyst (for example, platinum) and an ionomer having, for example, a sulfonic acid group ($—SO_3H$). An anode gas diffusion layer 155 and a cathode gas diffusion layer 156 are respectively disposed on the anode catalyst layer 152 and the cathode catalyst layer 153. The anode gas diffusion layer 155 and the cathode gas diffusion layer 156 are formed of, for example, carbon paper or carbon nonwoven fabric. In addition, the anode gas diffusion layer 155 and the cathode gas diffusion layer 156 may also be formed of expanded metal, or a porous member other than the carbon paper or carbon nonwoven fabric.

The cathode separator plate 180 includes a protrusion 181 which protrudes in a direction toward the anode separator plate 170 of the adjacent cell (the power generation cell 100 or the dummy cell 200). The anode separator plate 170 includes a receiving portion 171 at a position facing the protrusion 181. As the protrusion 181 is pressed against the receiving portion 171, a seal is formed between the cells (between the power generation cells 100 or between the power generation cell 100 and the dummy cell 200). An adhesive or a seal member (not illustrated) is disposed between the protrusion 181 and the receiving portion 171.

The anode separator plate 170 includes an anode gas introduction flow path forming portion 173 used to form the power generation cell anode gas introduction flow path 120 that communicates with the anode gas supply manifold 420. Although illustration of similar structures is omitted, the anode separator plate 170 includes an anode gas introduction flow path forming portion used to form the power generation cell anode gas lead-out flow path 125 that communicates with the anode gas discharge manifold 425. Furthermore, the cathode separator plate 180 includes a cathode gas introduction flow path forming portion and a cathode gas lead-out flow path forming portion used to form the power generation cell cathode gas introduction flow path 110 and the power generation cell cathode gas lead-out flow path 115.

Figure 5:
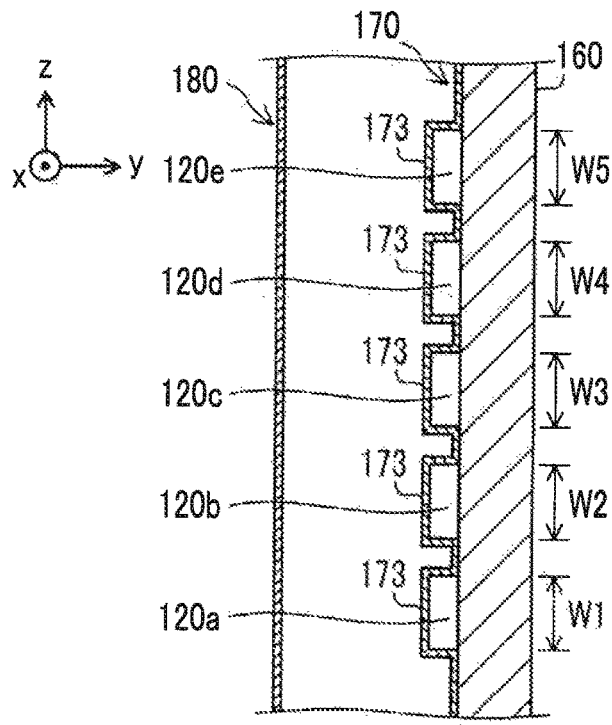
FIG. 5 is a sectional view of a power generation cell reaction gas introduction flow path taken along the section V-V of FIGS. 3 and 4.

FIG. 5 is a sectional view of the power generation cell reaction gas introduction flow path taken along the section V-V of FIGS. 3 and 4. The anode gas introduction flow path forming portion 173 has a protruding shape protruding in a direction from the frame 160 to the cathode separator plate 180, and the power generation cell anode gas introduction flow paths 120a to 120e are formed between a recessed shape of the protruding shape of the anode separator plate 170 formed on the frame 160 side and the frame 160. In the first embodiment, the flow path widths W1 to W5 of the power generation cell anode gas introduction flow paths 120a to 120e are the same. In addition, the heights (the widths in the y direction) of the power generation cell anode gas introduction flow paths 120a to 120e are also the same.

Figure 6:
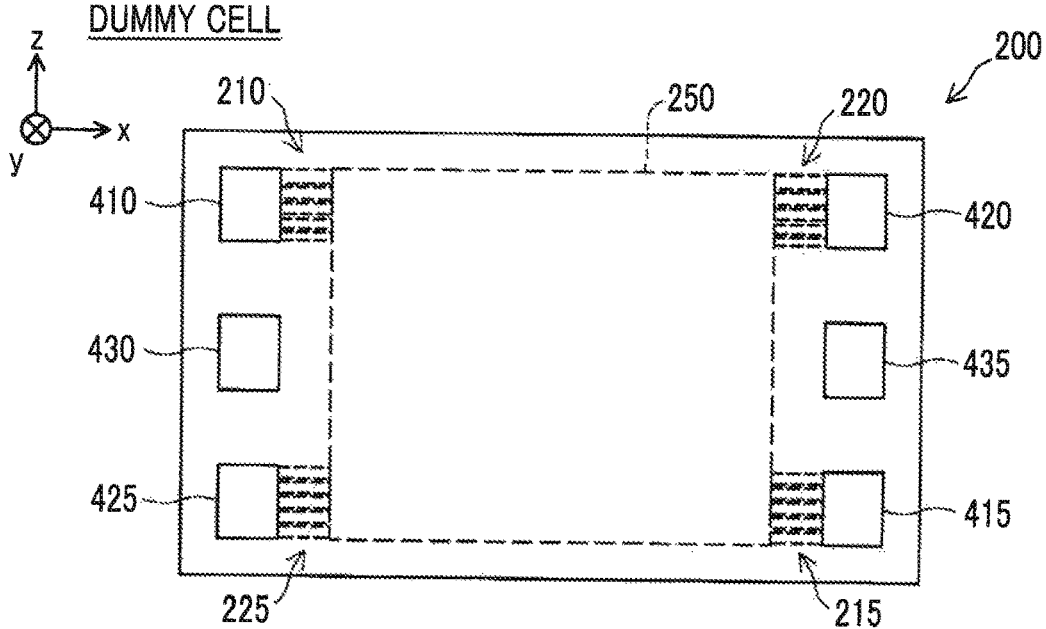
FIG. 6 is a plan view schematically illustrating a dummy cell.

FIG. 6 is a plan view schematically illustrating the dummy cell 200. The differences between the dummy cell 200 and the power generation cell 100 are that the dummy cell 200 is not provided with the membrane electrode assembly 154 in a central region 250 and the flow path widths of a dummy cell cathode gas introduction flow path 210 and a dummy cell anode gas introduction flow path 220 (also referred to as "the second introduction flow path 220") are different from the flow path widths of the power generation cell cathode gas introduction flow path 110 and the power generation cell anode gas introduction flow path 120. Furthermore, in the central region 250 of the dummy cell 200, a region where the anode gas flows and a region where the cathode gas flows are separated from each other by the resin forming the frame 160 so that the anode gas and the cathode gas are not mixed with each other. The flow path widths of a dummy cell cathode gas lead-out flow path 215 and a dummy cell anode gas lead-out flow path 225 of the dummy cell 200 are the same as the flow path widths of the power generation cell cathode gas lead-out flow path 115 and the power generation cell anode gas lead-out flow path 125 of the power generation cell 100.

Figure 7:
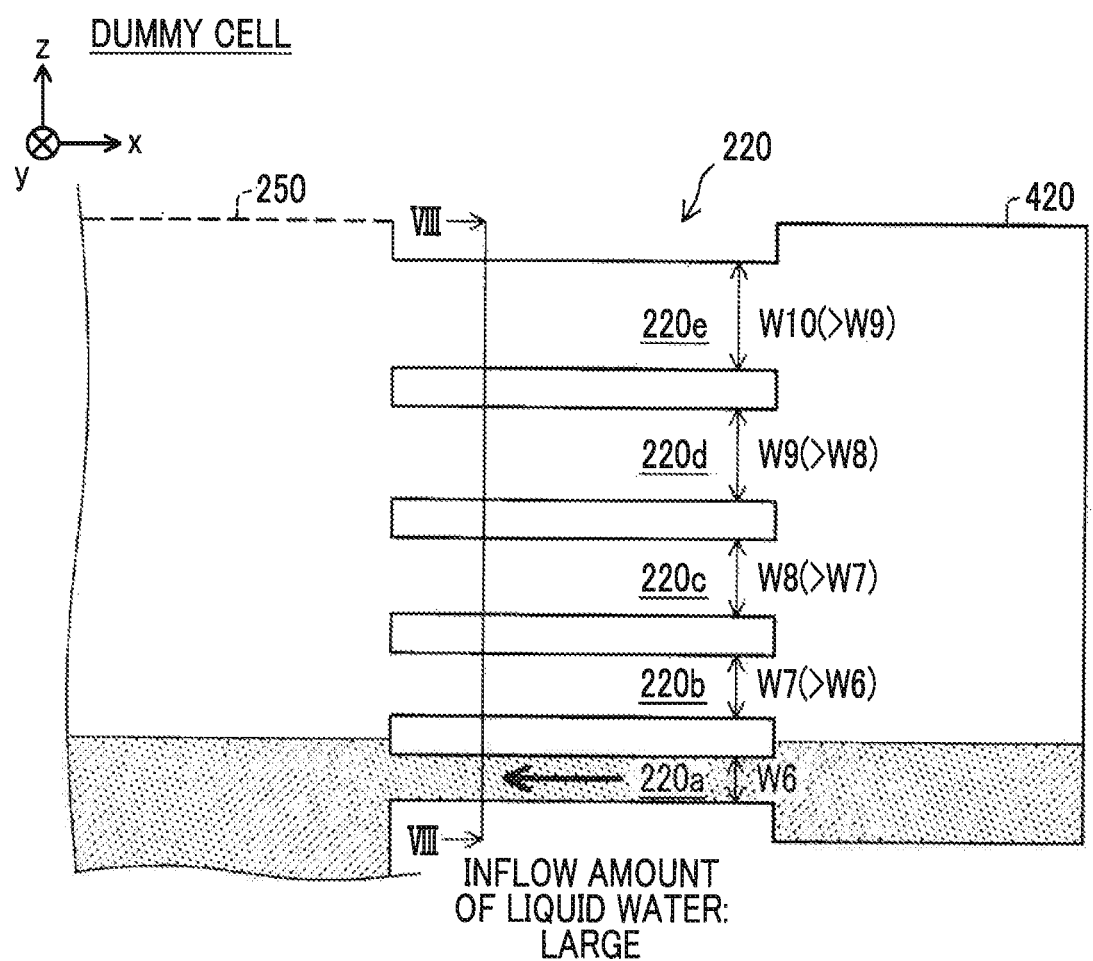
FIG. 7 is an enlarged schematic explanatory view illustrating a dummy cell anode gas introduction flow path of the dummy cell.

FIG. 7 is an enlarged schematic explanatory view illustrating the dummy cell anode gas introduction flow path 220 of the dummy cell 200. The dummy cell anode gas introduction flow path 220 includes a plurality of dummy cell anode gas introduction flow paths 220a, 220b, 220c, 220d, 220e arranged along the direction of gravity. A flow path width W6 of the dummy cell anode gas introduction flow path 220a at the lowermost end in the direction of gravity is set to be narrower than the average flow path width of the dummy cell anode gas introduction flow paths 220a, 220b, 220c, 220d, 220e. In the example illustrated in FIG. 7, flow path widths W6, W7, W8, W9, W10 of the dummy cell anode gas introduction flow paths 220a, 220b, 220c, 220d, 220e satisfy W6<W7<W8 W9<W10. That is, in the dummy cell anode gas introduction flow paths 220 (second introduction flow paths), the flow path width W6 of the dummy cell anode gas introduction flow path 220a at the lowermost end in the direction of gravity is narrower than the flow path width W10 of the dummy cell anode gas introduction flow path 220e at the uppermost end in the direction of gravity. In addition, in a case where the dummy cell anode gas introduction flow paths 220a, 220b, 220c, 220d, 220e have two or more flow path widths, the dummy cell anode gas introduction flow path 220a at the lowermost end in the direction of gravity may have the smallest flow path width among the dummy cell anode gas introduction flow paths 220a, 220b, 220c, 220d, 220e. Therefore, for example, there may be a case where the flow path widths W6, W7 of the dummy cell anode gas introduction flow, paths 220a, 220b are the same (the flow path width in this case is referred to as Wa), the flow path widths W8, W9, W10 of the dummy cell anode gas introduction flow paths 220c, 220d, 220e are the same (the flow path width in this case is referred to as Wb), and Wa<Wb is satisfied. In the example illustrated in FIG. 7, the number of dummy cell anode gas introduction flow paths 220 is five, but is not limited thereto, and may be two or more.

When the liquid water infiltrates into the anode gas supply manifold 420, the dummy cell anode gas introduction flow path 220a at the lowermost end in the direction of gravity is first blocked. In the example illustrated in FIG. 7, the dummy cell anode gas introduction flow path 220a at the lowermost end in the direction of gravity is completely blocked with the liquid water. However, the dummy cell anode gas introduction flow paths 220b to 220e positioned above the lowermost end in the direction of gravity are not blocked with the liquid water.

Figure 8:
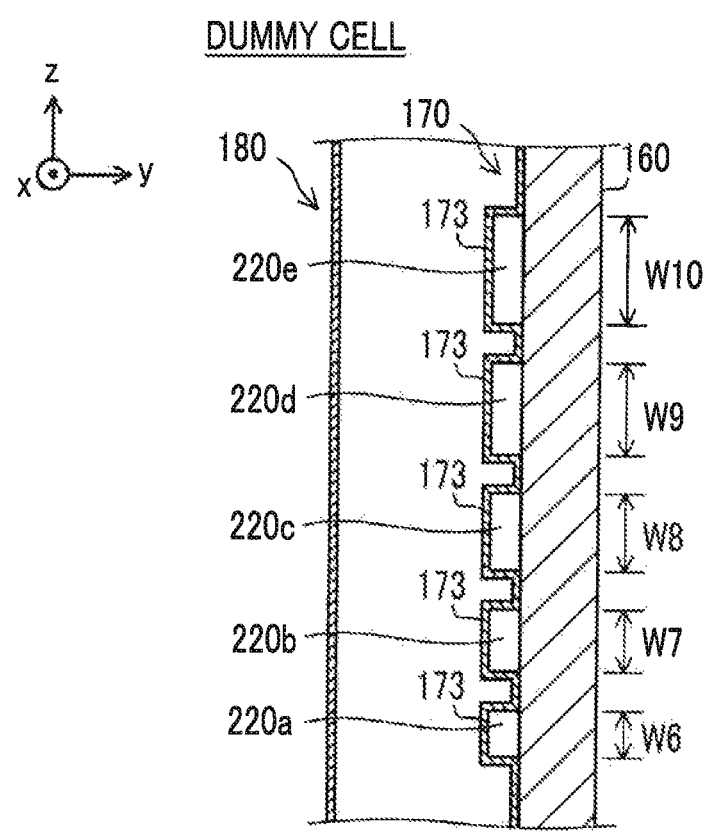
FIG. 8 is a sectional view of the dummy cell anode gas introduction flow path taken along the section VIII-VIII of FIG. 7.

FIG. 8 is a sectional view of the dummy cell anode gas introduction flow path 220 taken along the section VIII-VIII of FIG. 7. It can be seen that the sizes of the flow path widths W6, W7, W8, W9, W10 of the dummy cell anode gas introduction flow paths 220a, 220b, 220c, 220d, 220e satisfy W6<W7<W8<W9<W10. In addition, since the dummy cell 200 has the same configuration as the power generation cell 100 except that the dummy cell 200 is not provided with the membrane electrode assembly 154, the anode gas diffusion layer 155, and the cathode gas diffusion layer 156, illustration of the sectional view of the dummy cell anode gas introduction flow path 220 corresponding to FIG. 4 will be omitted.

Figure 9:
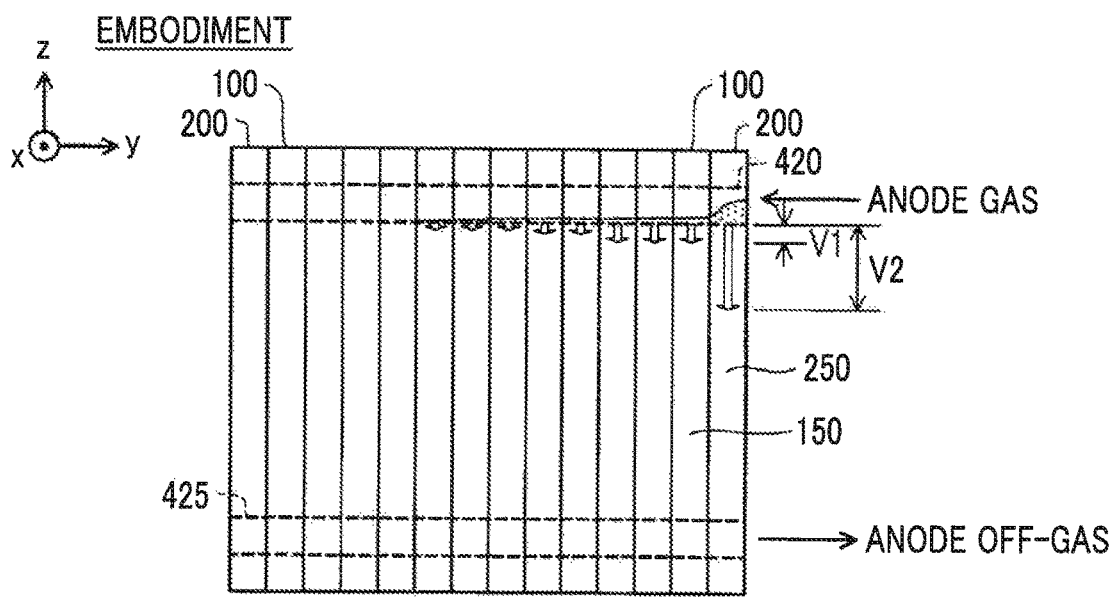
FIG. 9 is an explanatory view illustrating the movement amounts of liquid water moving to the central regions of the power generation cell and the dummy cell in a first embodiment.

FIG. 9 is an explanatory view illustrating the movement amounts of the liquid water moving to the central regions 150, 250 of the power generation cell 100 and the dummy cell 200 in the first embodiment. In FIG. 9, illustration of the current collecting plates 300, 310, the insulating plates 320, 330, and the end plates 340, 350 is omitted. The anode gas flows into the anode gas supply manifold 420 from the upper right side of the fuel cell stack 10 in the direction of gravity and is discharged from the lower right side of the fuel cell stack 10 in the direction of gravity. The movement amounts of the liquid water moving from the anode gas supply manifold 420 to the central region 150 (power generation region) of the power generation cell 100 and the central region 250 of the dummy cell 200 are respectively V1, V2 (V1<V2), and a large amount (V2) of the liquid water moves to the central region 250 of the dummy cell 200. However, a small amount (V1) of the liquid water moves to the central region 150 of the power generation cell 100.

Figure 10:
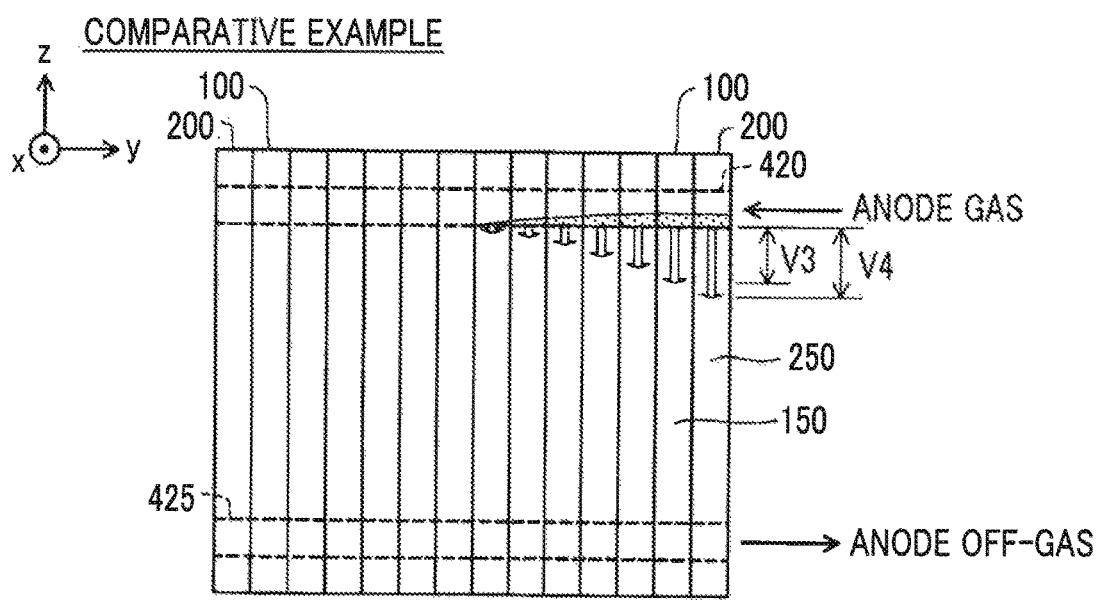
FIG. 10 is an explanatory view illustrating the movement amounts of the liquid water moving to the central regions of the power generation cell and the dummy cell in a comparative example.

FIG. 10 is an explanatory view illustrating the movement amounts of the liquid water moving to the central regions 150, 250 of the power generation cell 100 and the dummy cell 200 in a comparative example. In the comparative example, the flow path widths of the reaction gas introduction flow paths of the power generation cell 100 and the dummy cell 200 are the same, that is, W1=W2=W3=W4=W5=W6=W7 W8=W9=W10 is satisfied. In the comparative example, the volumetric amounts (also referred to as "movement amounts") of the liquid water moving from the anode gas supply manifold 420 to the central region 150 of the power generation cell 100 and the central region 250 of the dummy cell 200 are respectively V3, V4. When the movement amounts of the liquid water moving to the central region 150 of the power generation cell 100 are compared to each other, V1<V3 is satisfied. The reason for this is considered as follows.

When FIGS. 3 and 7 are compared to each other, in the first embodiment, when the liquid water in a volumetric amount V infiltrates into the anode gas supply manifold 420, since the flow path width W6 of the dummy cell anode gas introduction flow path 220a at the lowermost end in the direction of gravity is narrower than the average flow path width of the dummy cell anode gas introduction flow paths 220a, 220b, 220c, 220d, 220e, it becomes easier to block the dummy cell anode gas introduction flow path 220a at the lowermost end in the direction of gravity with the liquid water. When the dummy cell anode gas introduction flow path 220a is blocked with the liquid water, the pressure of the reaction gas in the anode gas supply manifold 420 increases, the pressure difference between the inlet and the outlet of the dummy cell anode gas introduction flow path 220a increases, and thus it becomes easier for the liquid water to move to the central region 250 of the dummy cell 200. The movement amount in this case is referred to as V2. As a result, the movement amount (V-V2) of the liquid water moving to a region corresponding to the anode gas supply manifold 420 of a specific power generation cell 100 adjacent to the dummy cell 200 is reduced due to the movement of the liquid water to the central region 250 of the dummy cell 200. Furthermore, the flow path width of the power generation cell anode gas introduction flow path 120a at the lowermost end in the direction of gravity of the power generation cell 100 adjacent to the dummy cell 200 is the same as the flow path widths W2 to W5 of the other power generation cell anode gas introduction flow paths 120b to 120e such that the power generation cell anode gas introduction flow path 120a is not narrowed by the liquid water and is less likely to be blocked. Accordingly, the pressure difference between the inlet and the outlet of the power generation cell anode gas introduction flow path 120a is relatively small, and a small amount (the movement amount V1) of the liquid water of the movement amount (V-V2) moves to the central region 150 of the specific power generation cell 100. As a result, it becomes easy for the liquid water to move to the central region 250 of the dummy cell 200 and the movement amount of the liquid water moving to the central region 150 of the power generation cell 100 is reduced. Accordingly, the intensive infiltration of the liquid water into the central region 150 of the specific power generation cell, particularly the power generation cell 100 adjacent to the dummy cell 200 can be suppressed.

Contrary to this, in the comparative example, when the liquid water in a volumetric amount V infiltrates into the anode gas supply manifold 420, since the flow path width of the dummy cell anode gas introduction flow path 220a at the lowermost end in the direction of gravity is not narrower than the average flow path width of the second introduction flow paths, it is difficult to block the dummy cell anode gas introduction flow path 220a at the lowermost end in the direction of gravity. In this case, the pressure difference between the inlet and the outlet of the dummy cell anode gas introduction flow path 220a is not large, and the movement amount V4 of the liquid water moving to the dummy cell 200 is smaller than the movement amount V2 of the first embodiment. Therefore, the movement amount (V-V4) of the liquid water moving to the anode gas supply manifold 420 of the power generation cell 100 adjacent to the dummy cell 200 is larger than the movement amount (V-V2) of the liquid water of the first embodiment. Therefore, the movement amount V3 of the liquid water moving to the central region 150 of the power generation cell 100 becomes larger than the movement amount V1 of the liquid water in the first embodiment. That is, the movement amount V1 of the liquid water moving to the central region 150 of the specific power generation cell 100 in the first embodiment is smaller than the movement amount V3 of the liquid water in the comparative example.

As described above, according to the first embodiment, a configuration (first configuration) is provided in which the flow path width W6 of the dummy cell anode gas introduction flow path 220a at the lowermost end in the direction of gravity is narrower than the average flow path width of the dummy cell anode gas introduction flow paths 220a, 220b, 220c, 220d, 220e. Therefore, the movement amount V2 of the liquid water moving to the central region 250 of the dummy cell 200 is relatively large and the movement amount V1 of the liquid water moving to the central region 150 of the specific power generation cell 100 can be relatively reduced. Accordingly, the intensive infiltration of the liquid water into the central region 150 of the specific power generation cell 100 can be suppressed.

Second Embodiment

Figure 11:
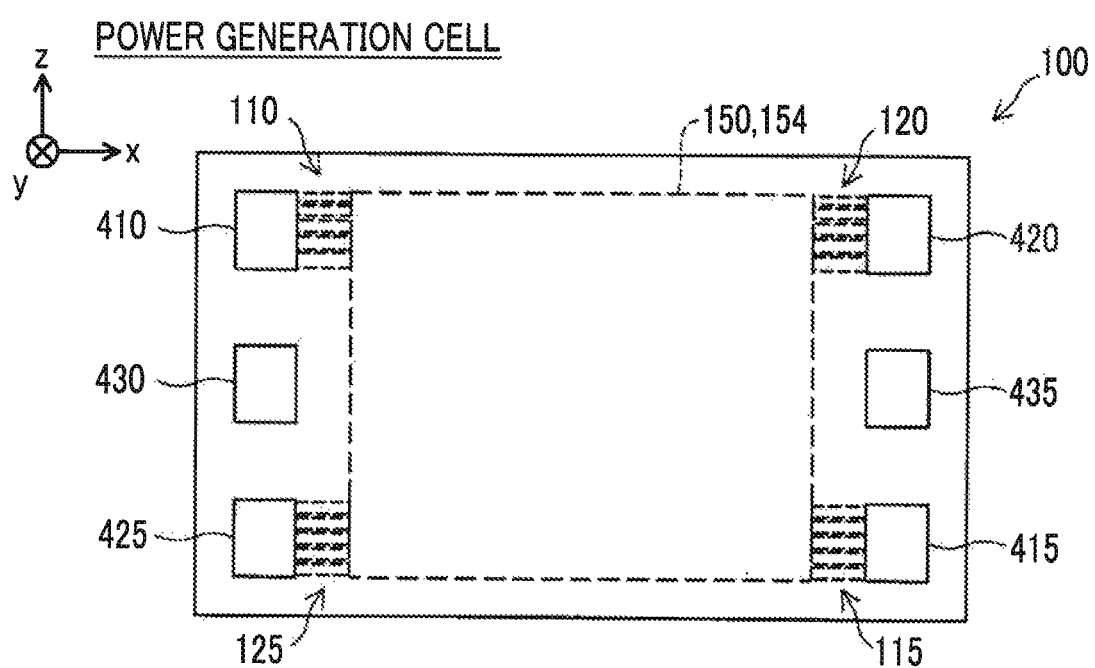
FIG. 11 is an explanatory view illustrating the power generation cell of a second embodiment.
Figure 12:
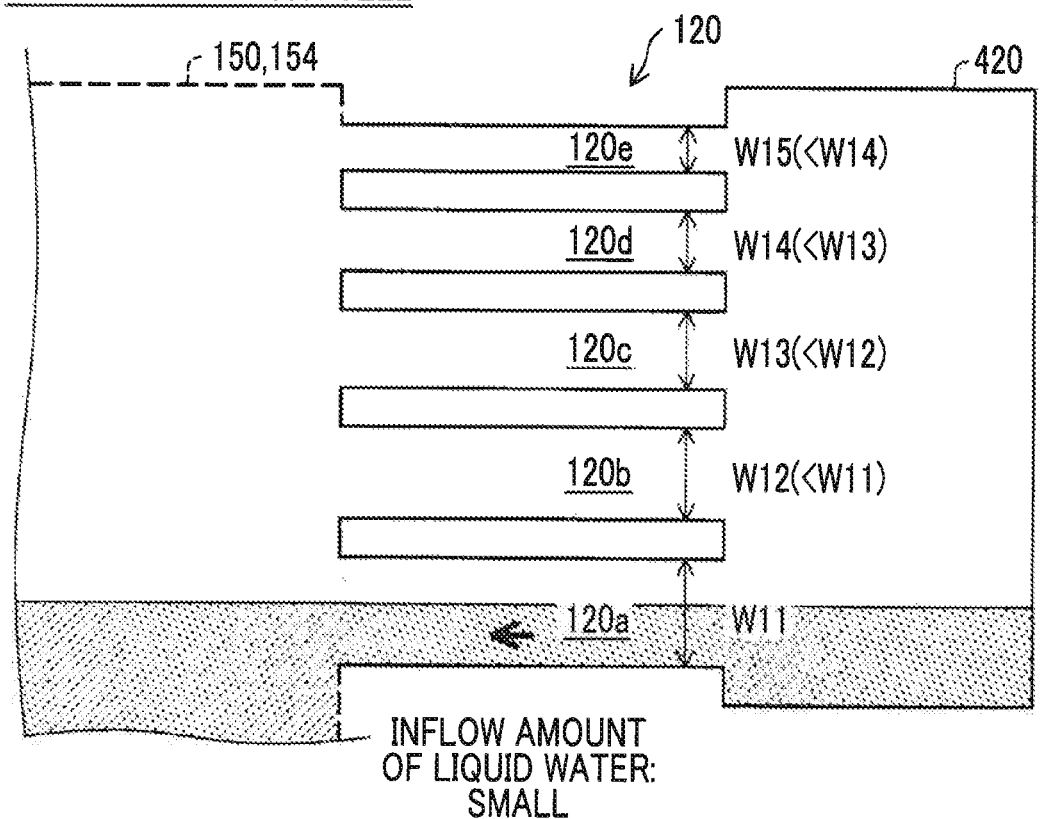
FIG. 12 is an enlarged schematic explanatory view illustrating the power generation cell anode gas introduction flow path of the power generation cell of the second embodiment.

FIG. 11 is an explanatory view illustrating the power generation cell 100 of a second embodiment. FIG. 12 is an enlarged schematic explanatory view illustrating the power generation cell anode gas introduction flow path 120 of the power generation cell 100 of the second embodiment. The differences from the first embodiment are that although the flow path widths W1 to W5 of the power generation cell anode gas introduction flow paths 120a to 120e are the same in the first embodiment, in the second embodiment, a flow path width W11 of the power generation cell anode gas introduction flow path 120a at the lowermost end in the direction of gravity is set to be wider than the average flow path width of the power generation cell anode gas introduction flow paths 120a to 120e. In the example in FIG. 12, flow path widths W11 to W15 of the power generation cell anode gas introduction flow paths 120a to 120e satisfy W11>W12>W13>W14>W15. That is, the flow path width W11 of the power generation cell anode gas introduction flow path 120e at the lowermost end in the direction of gravity is wider than the flow path width W15 of the power generation cell anode gas introduction flow path 120a at the uppermost end in the direction of gravity. In addition, in a case where the power generation cell anode gas introduction flow paths 120a, 120b, 120c, 120d, 120e have two or more flow path widths, the power generation cell anode gas introduction flow path 120a at the lowermost end in the direction of gravity may have the largest flow path width among the power generation cell anode gas introduction flow paths 120a, 120b, 120c, 120d, 120e. When the liquid water infiltrates into the anode gas supply manifold 420 and reaches the power generation cell 100, the power generation cell anode gas introduction flow path 120a at the lowermost end in the direction of gravity is first blocked. In the example in FIG. 12, the power generation cell anode gas introduction flow path 120a at the lowermost end in the direction of gravity is incompletely blocked with the liquid water.

According to the second embodiment, since the flow path width W11 of the power generation cell anode gas introduction flow path 120a at the lowermost end in the direction of gravity is wider than the average flow path width of the power generation cell anode gas introduction flow paths 120a to 120e, it is difficult to block the power generation cell anode gas introduction flow path 120a at the lowermost end in the direction of gravity with the liquid water. As a result, the pressure difference between the inlet and the outlet of the power generation cell anode gas introduction flow path 120a is small, and it becomes more difficult for the liquid water to move to the central region 150 of the power generation cell 100. That is, according to the second embodiment, a configuration (second configuration) is provided in which, in one or more power generation cells 100 adjacent to the dummy cell 200, the flow path width W6 of the power generation cell anode gas introduction flow path 120a at the lowermost end in the direction of gravity is wider than the average flow path width of the power generation cell anode gas introduction flow paths 120a, 120b, 120c, 120d, 120e. Therefore, the movement amount V1 of the liquid water moving to the central region 150 of a specific power generation cell 100 is relatively reduced, and thus the intensive infiltration of the liquid water into the central region 150 of the specific power generation cell 100 can be suppressed. In addition, the amount of the liquid water flowing through the anode gas supply manifold 420 relatively decreases toward the downstream of the reaction gas. Therefore, the one or more power generation cells 100 adjacent to the dummy cell 200 may have the second configuration.

The fuel cell stack 10 may have any one of the configurations of the first and second embodiments, or may have both the configurations thereof.

Third Embodiment

Figure 13:
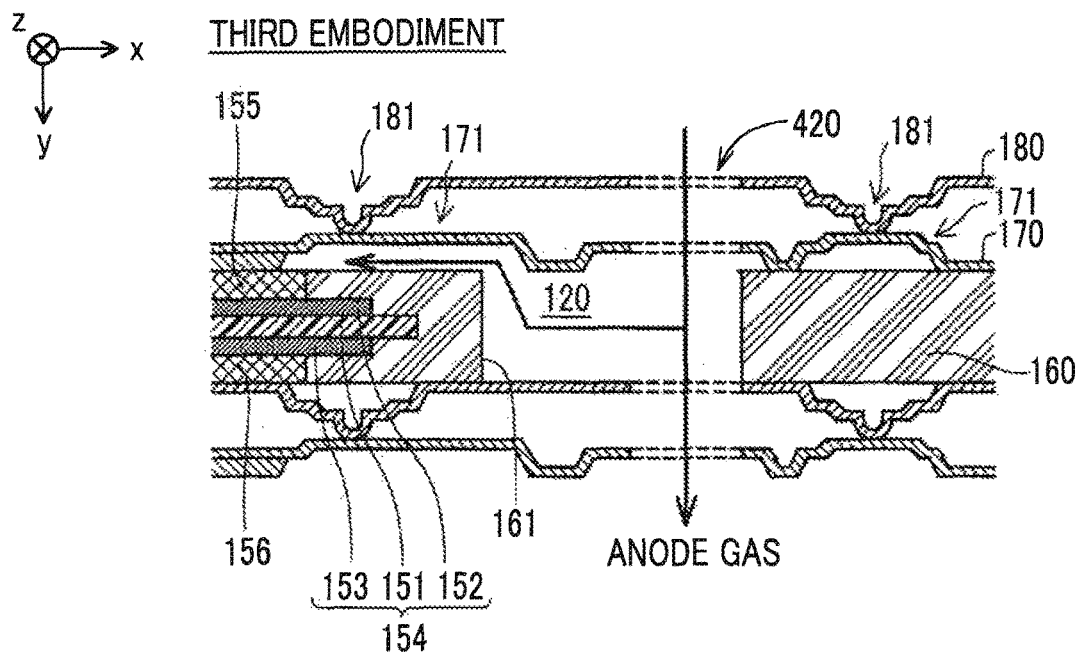
FIG. 13 is a sectional view of an anode gas introduction flow path of the power generation cell of a third embodiment corresponding to FIG. 4.

FIG. 13 is a sectional view of the anode gas introduction flow path of the power generation cell 100 of a third embodiment corresponding to FIG. 4. In the first and second embodiments, the power generation cell anode gas introduction flow path 120 (120a to 120e) is formed by using the anode gas introduction flow path forming portion 173 (FIG. 4) of the anode separator plate 170. Contrary to this, in the third embodiment, grooves 161 that communicate with the anode gas supply manifold 420 are formed in the frame 160, and the power generation cell anode gas introduction flow paths 120 are formed by using the grooves 161. The same applies to the anode gas lead-out flow path, the cathode gas introduction flow path, and the cathode gas lead-out flow path, and such flow paths are also formed in the dummy cell 200 by the grooves 161 in the same manner.

Figure 14:
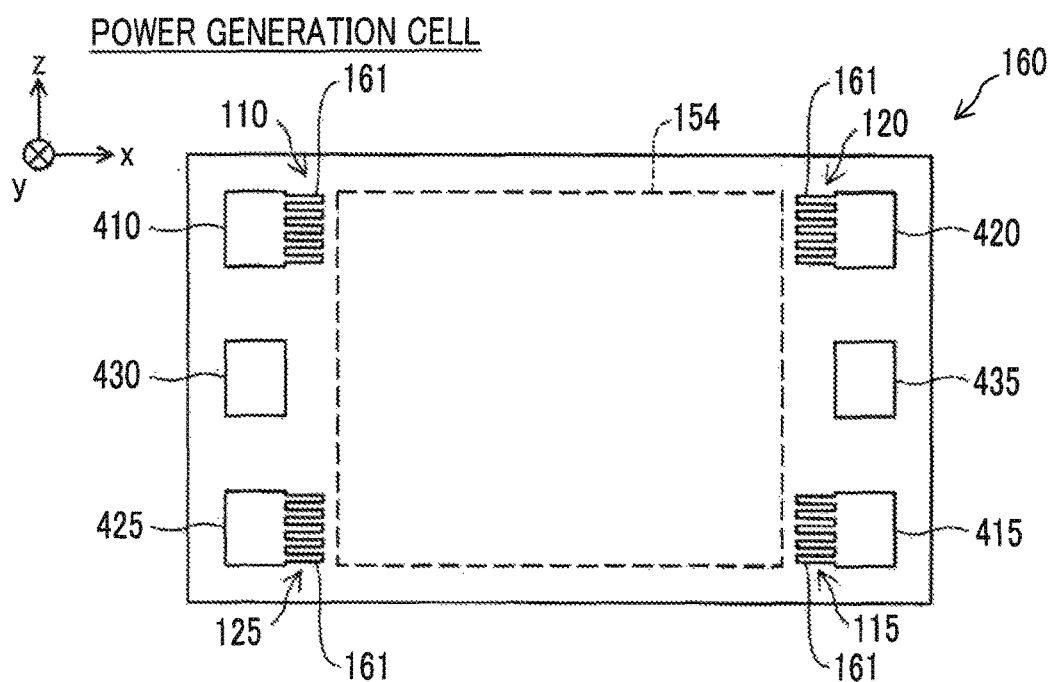
FIG. 14 is a plan view of a frame of the power generation cell of the third embodiment.

FIG. 14 is a plan view of the frame 160 of the power generation cell 100 of the third embodiment. The frame 160 is provided with the grooves 161 having a shape of comb teeth on the membrane electrode assembly 154 side of the anode gas supply manifold 420. The grooves 161 having the shape of comb teeth are also formed for the anode gas discharge manifold 425, the cathode gas supply manifold 410, and the cathode gas discharge manifold 415. The grooves 161 having the shape of comb teeth are also formed for the manifolds 410, 415, 420, 425 even in the frame 160 of the dummy cell 200. Here, in the third embodiment, the flow path widths of the power generation cell anode gas introduction flow paths 120a to 120e or the flow path widths of the dummy cell anode gas introduction flow paths 220a to 220e formed by the grooves 161 are set to the same flow path widths as in the first embodiment or the same flow path widths as in the second embodiment.

According to the third embodiment, the flow path widths of the power generation cell anode gas introduction flow paths 120a to 120e or the flow path widths of the dummy cell anode gas introduction flow paths 220a to 220e are the same as those in the first and second embodiments, and thus the same effects as in the first and second embodiments are achieved.

Furthermore, according to the third embodiment, since the introduction flow paths or the lead-out flow paths for the reaction gas are formed by using the grooves 161 formed in the frame 160, the anode separator plate 170 and the cathode separator plate 180 do not need to be separately prepared in the power generation cell 100 and the dummy cell 200 and can be used in common. That is, there is no need to change a mold used to produce the anode separator plate 170 and the cathode separator plate 180 between the power generation cell 100 and the dummy cell 200.

In the first to third embodiments, the anode gas introduction flow paths 120, 220 are exemplified. However, the cathode gas introduction flow paths 110, 210 can adopt the same configuration.

Modification Example

In each of the embodiments, although the relationship in size between the flow path width W6 of the dummy cell anode gas introduction flow path 220a at the lowermost end in the direction of gravity and the flow path width W1 of the power generation cell anode gas introduction flow path 120a at the lowermost end in the direction of gravity is not described, it is preferable that the flow path width W6 of the dummy cell anode gas introduction flow path 220a is narrower than the flow path width W1 of the power generation cell anode gas introduction flow path 120a. In this case, it becomes easier to block the dummy cell anode gas introduction flow path 220a with the liquid water. Therefore, it becomes easy for the liquid water to move to the central region 250 of the dummy cell 200 and it becomes more difficult to block the power generation cell anode gas introduction flow path 120a with the liquid water. As a result, the intensive infiltration of the liquid water into the central region 150 of the specific power generation cell 100 can be suppressed.

The disclosure is not limited to the embodiments or modification examples described above and can be realized as various configurations. For example, technical features in the embodiments and modification examples corresponding to the technical features in each of the aspects described in "SUMMARY" can be appropriately replaced or combined in order to solve a portion or the entirety of the problems described above, or accomplish a portion or the entirety of the effects described above. In addition, unless the technical features described above are described as indispensable in this specification, the technical features can be appropriately deleted.

What is claimed is:

1. A fuel cell stack comprising:
a plurality of power generation cells stacked; and
a dummy cell that is provided, of both end portions of the power generation cells, at the end portion on an upstream side in a direction in which a reaction gas supplied to the fuel cell stack flows and that does not generate power, wherein:
the fuel cell stack has a reaction gas supply manifold which passes through the power generation cells and the dummy cell;
the power generation cell has a plurality of first introduction flow paths arranged along a direction of gravity to introduce the reaction gas from the reaction gas supply manifold to a power generation region of the power generation cell;
the dummy cell has a plurality of second introduction flow paths arranged along the direction of gravity to introduce the reaction gas from the reaction gas supply manifold to a central region of the dummy cell; and
the fuel cell stack has at least one of
a first configuration in which a flow path width of the second introduction flow path at a lowermost end in the direction of gravity among the second introduction flow paths is narrower than an average flow path width of the second introduction flow paths, and
a second configuration in which, in the one or more power generation cells adjacent to the dummy cell, a flow path width of the first introduction flow path at a lowermost end in the direction of gravity among the first introduction flow paths is wider than an average flow path width of the first introduction flow paths.

2. The fuel cell stack according to claim 1, wherein the fuel cell stack has both the first configuration and the second configuration.

3. The fuel cell stack according to claim 1, wherein the flow path width of the second introduction flow path at the lowermost end in the direction of gravity is narrower than the flow path width of the first introduction flow path at the lowermost end in the direction of gravity.

4. The fuel cell stack according to claim 1, wherein, in the first configuration, the flow path width of the second introduction flow path at the lowermost end among the second introduction flow paths is the narrowest among the second introduction flow paths.

5. The fuel cell stack according to claim 4, wherein, in the first configuration, regarding flow path widths of the second introduction flow paths, the flow path widths of the second introduction flow paths positioned above the second introduction flow path at the lowermost end are set such that the farther the second introduction flow path apart from the second introduction flow path at the lowermost end, the wider the flow path width of the second introduction flow path.

6. The fuel cell stack according to claim 1, wherein, in the second configuration, the flow path width of the first introduction flow path at the lowermost end among the first introduction flow paths is the widest among the first introduction flow paths.

7. The fuel cell stack according to claim 6, wherein, in the second configuration, the flow path widths of the first introduction flow paths positioned above the first introduction flow path at the lowermost end are set such that the farther the first introduction flow path apart from the first introduction flow path at the lowermost end, the narrower the flow path width of the first introduction flow path.

\* \* \* \* \*